United States Patent
Hoffmann, Sr.

(10) Patent No.: US 6,231,949 B1
(45) Date of Patent: May 15, 2001

(54) SURFACE REPAIR ASSEMBLY INCLUDING NON-METALLIC REPAIR PATCH

(75) Inventor: Dennis Hoffmann, Sr., McHenry, IL (US)

(73) Assignee: Pro Patch Systems, Inc., McHenry, IL (US)

( * ) Notice: Subject to any disclaimer, the term of this patent is extended or adjusted under 35 U.S.C. 154(b) by 0 days.

(21) Appl. No.: 09/022,395

(22) Filed: Feb. 12, 1998

(51) Int. Cl.$^7$ ............................... B32B 3/26; B32B 35/00
(52) U.S. Cl. ........................ 428/139; 428/63; 428/131; 428/138; 428/134; 428/343; 428/41.7; 428/41.8; 52/514; 52/514.5; 156/94
(58) Field of Search ................ 428/63, 131, 138, 428/139, 134, 343, 41.7, 8; 52/514, 514.5; 156/94

(56) References Cited

U.S. PATENT DOCUMENTS

| | | | |
|---|---|---|---|
| 4,122,222 | 10/1978 | Parker | 428/66 |
| 4,135,017 | 1/1979 | Hoffmann, Sr. | 428/78 |
| 4,358,495 | 11/1982 | Parker | 428/66 |
| 4,519,856 | * 5/1985 | Lazzara | 156/49 |
| 4,707,391 | 11/1987 | Hoffmann, Sr. | 428/63 |
| 5,298,099 | 3/1994 | Hoffmann, Sr. | 156/94 |
| 5,620,768 | 4/1997 | Hoffmann, Sr. | 428/77 |
| 5,763,043 | * 6/1998 | Porter et al. | 428/109 |
| 5,817,200 | * 10/1998 | O'ffil | 156/94 |

* cited by examiner

Primary Examiner—William P. Watkins, III
(74) Attorney, Agent, or Firm—Baker & McKenzie

(57) ABSTRACT

An improved surface repair assembly for repairing a damaged portion of an exposed surface of is provided. The surface repair assembly includes a surface repair patch and a curable surface repair compound. The surface repair patch comprises a sheet which is formed from a plastically deformable inelastic polymeric material. The sheet has a plurality of openings which extend from the first side to the second side of the sheet. The openings are arranged about the sheet so that a network of strips of polymeric material is formed. Each of the strips is capable of being plastically deformed in any direction so that the sheet may be shaped to correspond to the contour of the surface being repaired. The sheet supports, positions, and reinforces the curable repair compound on the surface before the repair compound is cured. In one version of the invention, the second side of the repair patch includes an adhesive for affixing the patch to the surface to be repaired. A method for repairing a damaged portion of an exposed surface of wallboard using the surface repair assembly is also provided. The method includes the steps of selecting a repair patch having the features of the present invention, shaping the patch to correspond to the contour of the surface, anchoring the patch to the surface, spreading curable repair compound over the repair patch, contouring the repair compound to the shape of the surface and allowing the compound to cure.

18 Claims, 1 Drawing Sheet

SURFACE REPAIR ASSEMBLY INCLUDING NON-METALLIC REPAIR PATCH

BACKGROUND OF THE INVENTION

1. Field of the Invention

This invention relates generally to repair materials and more particularly to a surface repair assembly including a non-metallic repair patch and a method for repairing a damaged portion of an exposed surface using the surface repair assembly.

2. Description of the Related Art

There has long been a need in the art for inexpensive wall repair systems, which are relatively uncomplicated and which may be utilized by the non-professional, such as the homeowner. Various wall or surface repair systems that utilize a repair patch have been proposed as an option for repairing damaged portions of surfaces, such as holes in drywall material. These repair patches are designed so as to reinforce and position the curable repair materials, such as plaster or polymeric materials, that are applied to the surface being repaired.

While these repair patches have produced satisfactory results, certain repairs to non-planar, contoured structures have been rendered difficult because of the inability to form a correctly contoured matching surface for holding, positioning and reinforcing the repair materials. For instance, certain repair patches include a rigid plate which is formed from a metallic material. This type of repair patch cannot be deformed freely in all directions because the rigid plate is often formed from metal strip of a relatively thick gauge. In addition, certain grades of metallic strip or sheet which are used to form the rigid plate of the repair patch may be much more difficult to bend in certain directions. For example, it is well known that it is more difficult to bend a metal strip in a direction parallel to the direction in which the metal strip was rolled during processing. Therefore, while it may be possible to bend repair patches of this type in one direction to conform to a surface contour, it may be difficult to bend the repair patch in any number of directions in order to conform the repair patch to a highly contoured surface.

Repair patches consisting of a deformable mesh-like metallic sheet have been proposed as alternatives to repair patches including a rigid metallic plate. These repair patches are believed to be easier to contour to the shape of a surface being repaired and therefore, may be the repair material of choice in certain repair projects.

However, repair patches consisting of a deformable mesh-like metallic sheet do have certain drawbacks. For example, the use of metallic repair patches has rendered it difficult under certain circumstances to form a suitable surface finish after sanding. Specifically, if a user is not careful when sanding the cured repair compound that has been applied over a metallic repair patch, the cured repair compound may be abraded off of the metal surface in certain areas. The exposed metal is not readily smoothed and abraded by the sandpaper and therefore, the repair process must be started over, i.e., a fresh batch of curable repair compound must be applied over the metallic repair patch. If the repair patch were more easily abraded by sandpaper, it is possible that the exposed portion of repair patch could be sanded smooth with the remaining portion of cured repair compound.

In addition, many repair patches consisting of a deformable mesh-like metallic sheet have been unduly complicated in structure, and hence expensive to produce. For example, expanded metal structures have found use as a repair material. However, the manufacture of expanded metal involves a number of process steps which leads to a relatively high priced product.

Accordingly, in view of the shortcomings of the prior art repair patches, it is an object of the present invention to provide an inexpensive and relatively uncomplicated surface repair assembly patch for applying on the surface of an interior wall having a hole therein to be repaired.

It is a further object of the present invention to provide a surface repair assembly which will provide a smooth transition between the wall surface and that of the wall repair compound applied over the surface repair patch to complete the repair. It is still another object of the present invention to provide a surface repair assembly which includes a non-metallic surface repair patch that may be plastically deformed in any direction so that the patch may be shaped to correspond to the contour of the surface.

It is yet a further object of the present invention to provide a surface repair assembly which includes a surface repair patch that may be easily cut by scissors or other means for fitting around a miscut switch plate or light fixture hole, or a pipe projecting from the wall surface to seal the wall.

SUMMARY OF THE INVENTION

The present invention makes a significant contribution to the surface repair art by providing an improved surface repair assembly that satisfies the need for an inexpensive surface repair assembly which includes a non-metallic repair patch that can reinforce and position curable repair compound on a damaged portion of a surface. A surface repair assembly having the features of the present invention includes a surface repair patch and a curable surface repair compound.

The surface repair patch comprises a sheet which is formed from a plastically deformable inelastic polymeric material. The sheet has a first side and a second side, and a plurality of openings which extend from the first side to the second side of the sheet. The openings are arranged about the sheet so that a network of strips of polymeric material is formed, the strips being joined by an array of junctions. Each of the strips is capable of being plastically deformed in any direction so that the sheet may be shaped to correspond to the contour of the surface being repaired. The sheet supports, positions, and reinforces the curable repair compound on the surface before the repair compound is cured. In one version of the invention, the second side of the repair patch includes an adhesive for affixing the patch to the surface to be repaired. Certain configurations of the repair patch have proven to be highly advantageous when used in the surface repair patch of the present invention. For instance, it is advantageous to design the patch so that the surface area of the polymeric material on the first side of the sheet of the repair patch is in the range of about 60% to about 95% of the area bounded by the periphery of the first side of the sheet. Various polymeric materials are suitable for forming the sheet of the repair patch such as polyolefins, polyvinyl resins, blends of cellulosic fibers, and copolymers and mixtures thereof.

The curable repair compound is applied to the first side of the sheet so that the curable repair compound covers the sheet and substantially fills up the plurality of openings. Examples of curable repair compounds useable with the surface repair patch include plaster of paris, gypsum material, spackling compound, joint compound, and fiberglass resin compound.

The present invention is also directed to a method of using a non-metallic surface repair patch together with a curable repair compound to repair a damaged portion of an exposed surface. The method involves selecting a repair patch of sufficient area to surround the damaged portion of the surface. The repair patch comprises a sheet formed from a plastically deformable inelastic polymeric material. The sheet has a first side, a second side, and a plurality of openings extending from the first side to the second side of the sheet. The openings are arranged about the sheet so that a network of strips of polymeric material is formed. Each of the strips is capable of being plastically deformed in any direction so that the sheet may be shaped to correspond to the contour of the surface. After selecting a suitable repair patch, the repair patch is shaped to correspond to the contour of the surface and the patch is anchored to the surface so that the damaged portion of the surface is within the perimeter of the repair patch. A curable repair compound is then spread over the repair patch so as to cover the repair patch and substantially fill up the openings in the patch. The repair compound is then contoured to the shape of the surface and allowed to cure.

BRIEF DESCRIPTION OF THE DRAWINGS

These and other features, aspects, objects, and advantages of the present invention will be become better understood upon consideration of the following detailed description, appended claims and accompanying drawings where:

Figure 1:
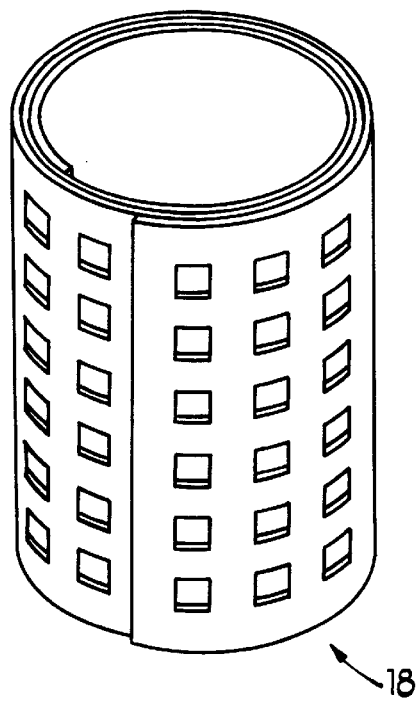
FIG. 1 is a perspective view of a contourable surface repair sheet as disposed in its rolled format, the repair sheet being suitable for use in the surface repair assembly of the present invention.

It should be understood that the drawings are not necessarily to scale and that the embodiments are sometimes illustrated by phantom lines and fragmentary views. In certain instances, details which are not necessary for an understanding of the present invention or which render other details difficult to perceive may have been omitted. It should be understood, of course, that the invention is not necessarily limited to the particular embodiments illustrated herein. Specifically, it should be noted that the present invention has been illustrated by a version of the invention that is used to repair damaged drywall surfaces. However, the surface repair assembly of the present invention is suitable for repair of various surfaces including surfaces made from metal, wood, fiberglass, plastic, drywall and wallboard.

Like reference numerals will be used to refer to like or similar parts from Figure to Figure in the following description of the drawings.

DESCRIPTION OF THE PREFERRED EMBODIMENTS

Figure 3:
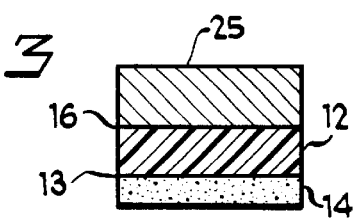
FIG. 3 is an enlarged cross-sectional view taken along lines 3—3 of FIG. 2, further showing the substantially planar structure of the sheet forming the surface repair patch of the present invention, and further showing thereon surface repair compound, and yet further showing thereon adhesive disposed on one side thereof for securing the deformable mesh-like sheet to the object to be repaired.
Figure 2:
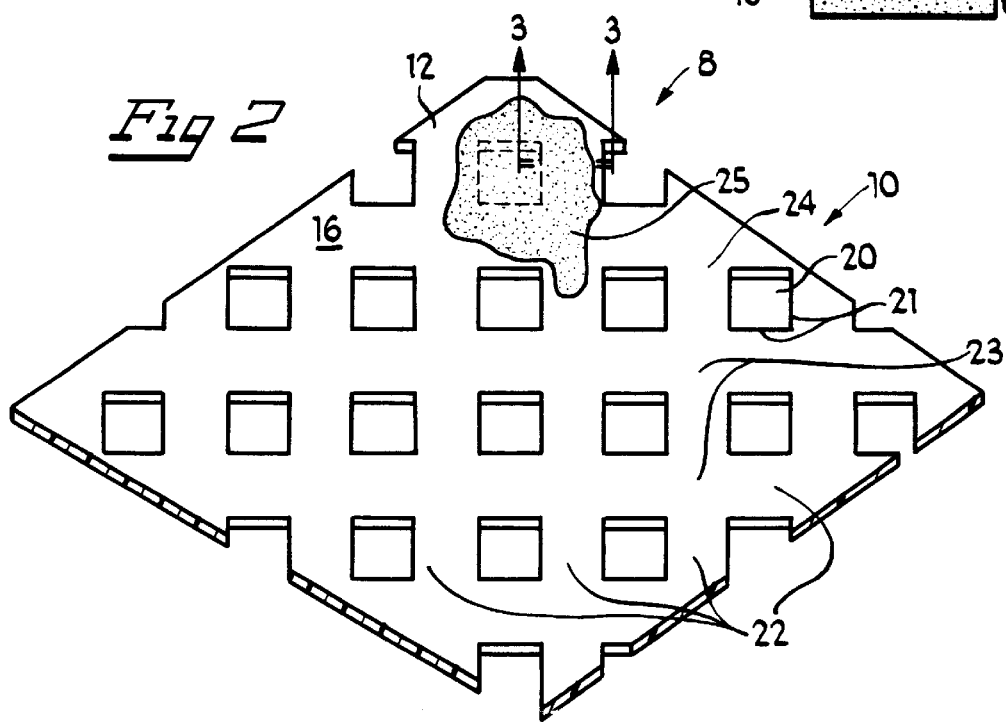
FIG. 2 is an enlarged top view of the surface repair assembly of the present invention showing the openings in the surface repair patch which define a mesh-like structure.

Referring now to FIGS. 1–3, there is shown a surface repair assembly generally designated at 8. The surface repair assembly 8 includes a contourable surface repair patch 10 which comprises a sheet 12. The sheet 12 has a first side 16 and a second side 13. The second side 13 supports an adhesive 14 for attachment of the surface repair patch 10 to the wall surface or similar object to be repaired. For purposes of the present invention, the term "wall surface" includes the facing surfaces of both vertical walls and ceilings, and whether made of drywall, plaster or other wall material. The contourable surface repair patch 10 may be supplied in conveniently precut shapes or may be cut from a roll of material as shown in FIG. 1. The rolled format 18 as shown in FIG. 1 provides for convenient storage, shipment and sale.

Referring more particularly to FIG. 2, it can be seen that the surface repair assembly 8 broadly comprises a contourable surface repair patch 10 and a layer of curable surface repair compound 25. The sheet 12 of the surface repair patch 10 has a series of openings 20 which extend from the first side 16 to the second side 13 of the sheet 12. The openings 20 have edges 21 which define the perimeter of each opening 20. The openings 20 are arranged about the sheet 12 so that a network of strips 22 of material is formed. The strips 22 are joined by an array of junctions 23, which in the embodiment shown in FIG. 2 give the sheet 12 the appearance of a mesh-like structure. The strips 22 and junctions 23 combine to form a reinforcing surface 24 of the first side 16 of the surface repair patch 10.

Referring now to FIG. 3, a cross-section of the structure of the surface repair assembly 8 is shown. The sheet 12 of the surface repair patch 10 has a second side 13 which is adapted to receive adhesive 14. The adhesive 14 is preferably a pressure sensitive adhesive and is applied to the second side 13 of sheet 12 for securing surface repair patch 10 to the surface to be repaired. The first side 16 of the sheet 12 is adapted to receive a curable repair compound 25.

The sheet 12 of the surface repair patch 10 is formed from a plastically deformable inelastic polymeric material. As used throughout the specification and claims, a plastically deformable inelastic material refers to a material that will deform and will not completely return to its original shape when a force is applied to the material. The polymeric material though being inelastic is nevertheless easily deformable. Therefore, the polymeric material will retain its shape after it has been bent and/or twisted into a desired form.

Suitable plastically deformable inelastic polymeric materials used to form the sheet 12 include polyolefins, such as polyethylene and polypropylene, polyvinyl resins, and copolymers and mixtures thereof. Material containing blends of cellulosic fibers, such as paper, may also be used for forming the sheet 12. Polyvinyl resins that are inelastic but deformable, such as polyvinyl butyral resins or polyvinyl chloride, are particularly advantageous when used to form the sheet 12 of the surface repair patch 10. The polymeric material may also be blended with a filler selected from the group consisting of metal carbonates, metal silicates, metal oxides, glass fibers, wood sawdust, and wood flour. The filler may serve to increase the rigidity of the polymeric material and may even lower the cost of forming the sheet. The rigidity of the polymeric material may also be increased by increasing the density of the polymeric material used to form the sheet.

By forming the sheet 12 of the surface repair patch 10 from a plastically deformable inelastic polymeric material and providing the sheet 12 with plurality of openings 20, a highly effective contourable surface repair patch is developed. It can be seen from FIG. 2 that the openings 20 in the sheet 12 form a grid structure. The grid structure is defined by strips 22 of material which are connected at junctions 23. While the openings 20 shown in the embodiment of FIG. 2 are square, the openings 20 may be any of various shapes including round, square, diamond and rectangular. Preferably, the openings 20 are of a uniform size and are regularly spaced about the sheet 12.

The arrangement of a plurality of strips 22 of plastically deformable inelastic polymeric material allows the surface repair patch 10 to deformed into an infinite number of shapes. Specifically, each one of the strips 22 may be twisted, bent, stretched or compressed depending on the forces applied to the sheet. Upon deforming, the strips 22 retain their shape so that the surface repair patch 10 assumes a stable configuration. Because a large number of strips 22 of material are present in each repair patch 10 and each strip 22 is capable of being deformed into numerous positions, an infinite number of stable configurations of the repair patch are possible. Therefore, the surface repair patch 10 may be shaped to correspond to the contour of virtually any surface and may be used for supporting, positioning and reinforcing a curable surface repair compound. Of course, the surface repair patch 10 may also be used repair flat surfaces, in which case, the surface repair patch 10 may be applied to the surface without the need for shaping.

It is preferred that the plastically deformable inelastic polymeric material selected for use in the sheet 12 of the repair patch 10 is able to be smoothed and abraded by sandpaper or other abrasive material which is commonly selected for smoothing cured surface repair compound to a desired surface finish. Namely, it is preferred that the polymeric material may be smoothed and abraded by a grade of sandpaper or similar abrasive material which is customarily selected for finishing cured surface portions of curable surface repair compound such as plaster of paris, gypsum material, spackling compound, joint compound, fiberglass resin compound, spackle and the like. By selecting a polymeric material according to this parameter, it is assured that any repair patch material that is accidently exposed after the curable repair compound has dried may be sanded smooth with the remaining repair compound and suitably finished.

Figure 4:
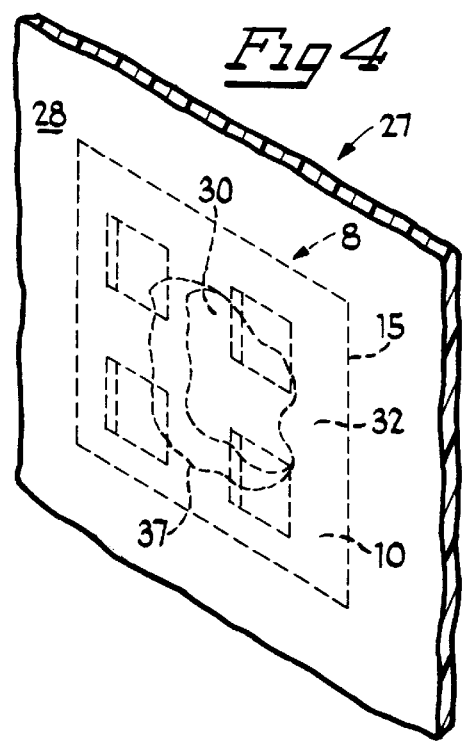
FIG. 4 shows a surface repair assembly disposed on a section of drywall.

Referring now to FIG. 4, the surface repair assembly 8 is shown disposed on a section of drywall generally designated at 27. The drywall section 27 has an outside surface 28 which is exposed when the drywall is installed on wooden studs. Surface repair patch 10 with edges 15 is shown in phantom covering a hole or opening 30 in the drywall to be repaired. The hole or opening 30 has a perimeter 37.

Surface repair assembly 8 is applied to repair hole 30 in drywall section 27 by covering surface repair patch 10 with a thin layer of plaster of paris, gypsum material, spackling compound, joint compound, fiberglass resin compound, spackle or other curable repair compound 25 which completes the assembly. It can be seen that a portion 32 of the outside surface 28 of the drywall section 27 which lies between the perimeter 37 of the hole 30 and the edges 15 of surface repair patch 10 is covered by the surface repair patch. An adhesive coating 14 may be disposed on the second side 13 of sheet 12 over at least a substantial portion of the second side 13 of sheet 12 and alternatively over the entire second side 13 of sheet 12 for firmly bonding sheet 12 to the exposed surface 28 of the drywall section 27.

A hole 30 in drywall section 27 can be repaired in accordance with the method of the present invention. First, a repair sheet having a side including an adhesive is selected for use in the method. The repair sheet is trimmed to form a surface repair patch 10 of sufficient area to surround the damaged portion of the exposed surface of the drywall. Preferably, the repair sheet is of a material and thickness such that the repair sheet can be trimmed to a convenient size with a scissors. In an alternative embodiment of the method of the invention, a surface repair patch 10 may be selected from patches that have been conveniently precut to a predetermined size and shape.

After a surface repair patch 10 of a suitable size has been prepared or selected, the repair patch 10 is positioned on the outside surface 28 of the drywall section 27 so that all edges 15 of the surface repair patch 10 surround the perimeter 37 of the hole 30 in the drywall section 27. Pressure is applied to the surface repair patch 10 so as to anchor the surface repair patch 10 to the outside surface 28 of the drywall section 27.

A curable repair compound 25, such as plaster of paris, gypsum material, spackling compound, joint compound, fiberglass resin compound, or the like, is then spread over the repair patch 10 and portions of the outside surface 28 of the drywall section 27 near the edges 15 of the surface repair patch 10. The repair compound 25 is then contoured with a flat-bladed tool so as to blend into the outside surface 28 of the drywall section 27. Preferably, the repair compound 25 is contoured so that it is substantially smooth with the outside surface 28 of the drywall section 27. It can be appreciated that only a small amount of repair compound is required in the method of the invention in order to cover the surface repair patch 10 and portions of the outside surface 28 of the drywall section 27 near the edges 15 of the surface repair patch 10. In contrast, other prior methods often require building up and finishing a number of layers of finishing compound. After the repair compound has been contoured to the outside surface 28 of the drywall section 27, the repair compound is allowed to cure. Optionally, outer surface portions of the repair compound may be sanded with an abrasive material to obtain a desired surface finish after the repair compound has been cured. Thus, a surface repair assembly 8 can be prepared using only a repair patch 10 and a curable surface repair compound 25.

Various advantageous modifications of the method of the present invention are also possible. For example, in an alternative version of the method of the invention, a surface repair patch 10 that does not include an adhesive may be used to repair the hole in the drywall. In this version of the invention, the surface repair patch 10 may be anchored to the outside surface 28 of the drywall 27 in a number of different manners. For instance, the surface repair patch 10 can be positioned on the outside surface 28 of the drywall section 27 so that all edges 15 of the surface repair patch 10 surround the perimeter 37 of the hole 30 and then nailed or stapled to the surface surrounding the hole 30. Alternatively, the surface repair patch 10 can be secured to the outside surface 28 of the drywall section 27 by applying curable repair compound 25 to the portion 32 of the outside surface 28 of the drywall section 27 that is adjacent the perimeter 37 of the hole 30, positioning the surface repair patch 10 on the outside surface 28 of the drywall 27 so that hole 30 is within the perimeter of the surface repair patch 10, and applying pressure to the surface repair patch 10 so that the surface repair patch 10 adheres to the curable repair compound 25.

The method of the present invention is also advantageous as it may be used to repair a variety of different types of holes in a wall surface, including for example, the hole around a pipe disposed through and projecting from the wall surface, a hole caused by wall damage, a miscut switch plate hole or light fixture hole.

Certain configurations of the sheet 12 of the surface repair patch 10 have proven to be advantageous when the surface repair patch 10 is incorporated into the surface repair assembly 8. For instance, it has been discovered that a preferred configuration of the surface repair patch 10 includes a first side 16 with openings 20 having a total area between about 5% and about 40% of the total area of the patch 10. In other words, the area of the reinforcing surface 24 of the first side 16 of the sheet 12 is in the range of about 60% to about 95% of the area bounded by the periphery of the first side 16 of the sheet 12 wherein the periphery of the first side 16 of the sheet 12 is defined as the outline that would be formed by a traverse of edges 15 of the patch 10 when no openings are present in the patch 10. This ratio of polymeric material reinforcing surface area to total area covered by the patch 10 has proven to be quite effective when employed with the curable surface repair compound 25 of the surface repair assembly 8 of the present invention.

The openings 20 in the sheet 12 of the surface repair patch 10 allow the curable surface repair compound 25 to flow or penetrate the reinforcing surface 24 of the repair patch 10 so that the surface repair assembly 8 actually repairs the damaged area on the inside as well as the outside of the damaged wall or similar surface. However, enough reinforcing surface area of polymeric material is available such that the repair assembly may support and reinforce the curable surface repair compound 25 while it cures. It can be appreciated that a surface repair patch 10 having openings 20 that comprise a large percentage of the reinforcing surface 24 of the sheet 12 will not properly reinforce and support surface repair compound 25. At the same time, a surface repair patch 10 having openings 20 that comprise a small percentage of the reinforcing surface of the sheet 12 will not be easily deformed into an infinite number of shapes as wider strips 22 may be difficult to twist, bend, stretch and compress into the desired shape. In addition, the wide strips may not as easily retain their shape after deformation thereby limiting the ability of the surface repair patch 10 to assume a stable configuration.

It has been also been found that a surface repair patch configuration wherein the openings 20 are regularly spaced about the first side 16 of the sheet 12 and are of a uniform size, i.e. each of the openings is substantially the same size, is desirable. The arrangement of regularly spaced, uniform sized openings allows the curable surface repair compound 25 to flow uniformly when applied to the first side 16 of the sheet 12 of the surface repair patch 10. This makes it easier for the user to apply a smooth uniform layer of curable surface repair compound 25 when preparing the surface repair assembly 8 of the present invention.

Certain sizes of the sheet 12 of the surface repair patch 10 have also proven to be advantageous when the surface repair patch 10 is incorporated into the surface repair assembly 8. Namely, the thickness of the sheet 12 of the surface repair patch 10 should preferably be at least 0.008 inches and should preferably not be thicker than 0.025 inches. It is within these thickness ranges that the surface repair patch 10 of the surface repair assembly 8 has an optimum balance between reinforcing strength and formability. Of course, surface repair patches having thicknesses outside of this size range may be suitable for certain applications. For instance, it has been found that thinner more flexible surface repair patches are advantageous when employed in a surface repair assembly used to repair a long narrow crack in a surface as the surface repair patch does not need to reinforce a large volume of surface repair compound. Similarly, thicker less flexible repair patches may be suitable for use in surface repair assemblies used to repair larger holes as there may be minimal need to precisely contour the repair patch to the surface being repaired.

The materials and configurations used in the sheet 12 of the surface repair patch 10 can also provide for a sheet that can be inexpensively manufactured. For instance, certain vinyl materials can be cut to any size, such as 4"×4" or 6"×6", and perforated to include any of a number of hole shapes using a steel rule die. In addition, the polymeric materials used in the sheet 12 are generally easy to recycle and are accepted by most recyclers. The use of certain metallic patches in surface repairs leads to a significant amount of metal waste which may be difficult to recycle.

Thus, it is seen that an improved surface repair assembly including a nonmetallic repair patch, and an improved method for repairing damaged portions of an exposed surface is provided. The present invention provides an inexpensive and relatively uncomplicated surface repair assembly patch which can be applied on a surface having a hole to be repaired. The surface repair assembly provided a smooth transition between the surface and that of the repair compound applied over the surface repair patch to complete the repair. The surface repair assembly achieves this smooth transition by way of a surface repair assembly which includes a non-metallic surface repair patch that may be plastically deformed in any direction so that the patch may be shaped to correspond to the contour of the surface. The surface repair assembly is suitable for repair of various surfaces including surfaces made from metal, wood, fiberglass, plastic, drywall and wallboard.

Although the present invention has been described in detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A surface repair assembly for repairing a damaged portion of an exposed surface, the assembly comprising:

a surface repair patch comprising a perforated sheet formed from a plastically deformable inelastic polymeric material, the sheet having a first side, a second side, and a plurality of openings extending from the first side to the second side of the sheet, the openings being arranged about the sheet so that a network of strips of polymeric material is formed, the strips being joined by an array of junctions, the strips capable of being plastically deformed in any direction so that the sheet may be shaped to correspond to the contour of the surface; and a curable repair compound, the curable repair compound being applied to the first side of the sheet so that the curable repair compound covers the sheet and substantially fills up the plurality of openings, the sheet being capable of supporting, positioning, and reinforcing the curable repair compound on the surface before the repair compound is cured.

2. The surface repair assembly of claim 1 wherein:

the surface area of the polymeric material on the first side of the sheet is in the range of about 60% to about 95% of the area bounded by the periphery of the first side of the sheet.

3. The surface repair assembly of claim 2 wherein:

the second side of the repair patch includes an adhesive applied to the second side to a size greater than the size of the damaged portion of the surface.

4. The surface repair assembly of claim 3 wherein:

the polymeric material is selected from the group consisting of polyolefins, polyvinyl resins, blends of cellulosic fibers, and copolymers and mixtures thereof, and the polymeric material is blended with a filler selected from the group consisting of metal carbonates, metal silicates, metal oxides, glass fibers, wood sawdust, and wood flour, and the curable repair compound is selected from the group consisting of plaster of paris, gypsum material, spackling compound, fiberglass resin compound, and joint compound; and the exposed surface comprises wallboard.

5. The surface repair assembly of claim 4 wherein:

the openings in the sheet are regularly spaced about the sheet, the openings in the sheet are a uniform size, and the openings in the sheet are configured in a shape selected from the group consisting of round, square, diamond and rectangular.

6. The surface repair assembly of claim 5 wherein:

the polymeric material is polyvinyl chloride.

7. The surface repair assembly of claim 6 wherein:

the sheet has a thickness from about 0.008 inches to about 0.025 inches.

8. The surface repair assembly of claim 7 wherein:

the polymeric material is capable of being abraded and smoothed by an abrasive material suitable for sanding dried sections of the curable repair compound.

9. A method of using a surface repair patch together with a curable repair compound to repair a damaged portion of an exposed surface, the method comprising the steps of:

selecting a repair patch of sufficient area to surround the damaged portion of the surface, the repair patch comprising a perforated sheet formed from a plastically deformable inelastic polymeric material, the sheet having a first side, a second side, and a plurality of openings extending from the first side to the second side of the sheet, the openings being arranged about the sheet so that a network of strips of polymeric material is formed, the strips being joined by an array of junctions, the strips capable of being plastically deformed in any direction so that the sheet may be shaped to correspond to the contour of the surface;

shaping the repair patch to correspond to the contour of the surface;

anchoring the repair patch to the surface so that the damaged portion of the surface is within the perimeter of the repair patch;

spreading a curable repair compound over the repair patch so as to cover the repair patch and substantially fill up the plurality of openings;

contouring the repair compound to the shape of the surface; and allowing the repair compound to cure.

10. The method of claim 9 further comprising the step of:

sanding outer surface portions of the repair compound after the repair compound has cured to obtain a desired surface finish.

11. The method of claim 10 wherein:

the surface area of the polymeric material on the first side of the sheet is in the range of about 60% to about 95% of the area bounded by the periphery of the first side of the sheet, and the openings in the sheet are regularly spaced about the sheet, the openings in the sheet are a uniform size, and the openings in the sheet are configured in a shape selected from the group consisting of round, diamond and rectangular.

12. The method of claim 11 wherein:

the second side of the repair patch includes an adhesive applied to the second side to a size greater than the size of the damaged portion of the surface for anchoring the repair patch to the surface.

13. The method of claim 12 wherein:

the polymeric material is selected from the group consisting of polyolefins, polyvinyl resins, blends of cellulosic fibers, and copolymers and mixtures thereof; and the curable repair compound is selected from the group consisting of plaster of paris, gypsum material, spackling compound, fiberglass resin compound, and joint compound; and the exposed surface comprises wallboard.

14. The method of claim 13 wherein:

the polymeric material is capable of being abraded and smoothed by an abrasive material suitable for sanding dried surface portions of the curable repair compound.

15. The method of claim 10 wherein the step of anchoring the repair patch to the exposed surface comprises:

applying curable repair compound to the exposed surface adjacent the damaged portion of the surface;

positioning the repair patch on the surface so that the damaged portion of the surface is within the perimeter of the repair patch; and applying pressure to the repair patch so that the repair patch adheres to the curable repair compound.

16. A surface repair assembly for repairing a damaged portion of an exposed surface, the assembly comprising:

a surface repair patch comprising a perforated sheet formed from a plastically deformable inelastic polymeric material, the sheet having a first side, a second side, and a plurality of openings extending from the first side to the second side of the sheet, the openings being arranged about the sheet so that a network of strips of polymeric material is formed, the strips being joined by an array of junctions, the strips capable of being plastically deformed in any direction so that the sheet may be shaped to correspond to the contour of the surface; and a curable repair compound, the curable repair compound being applied to the first side of the sheet so that the curable repair compound covers the sheet and substantially fills up and flows through the plurality of openings, the sheet having and adhesive applied to one side thereof, and said sheet having a thickness which provides said sheet with sufficient rigidity to render said sheet capable of spanning an opening in said damaged portion of said exposed surface with said compound carried by said sheet before the repair compound is cured, and said adhesive being capable holding said sheet and uncured compound in place over said opening.

17. The surface repair assembly of claim 16 wherein the material comprising said sheet is a polymeric material blended with a filler.

18. The surface repair assembly of claim 17 wherein:

non-perforated surface area of the sheet is about 60% to about 95% of the area bounded by the periphery of the sheet, and the sheet has a thickness from about 0.008 inches to about 0.025 inches.

* * * * *